United States Patent Office 2,849,290
Patented Aug. 26, 1958

2,849,290

PREPARATION OF PENTABORANE(11)

John P. Faust, Kenmore, Donald J. Mangold, Niagara Falls, and Ellsworth D. Whitney, Snyder, N. Y., assignors, by mesne assignments, to Olin Mathieson Chemical Corporation, a corporation of Virginia No Drawing. Application March 1, 1956
Serial No. 568,703

2 Claims. (Cl. 23—204)

This invention relates to a process for the preparation of pentaborane(11) ($B_5H_{11}$) and, in particular, provides a method for the production of pentaborane(11) by the thermal treatment of diborane in the presence of a catalyst, zirconium boride.

Pentaborane(11) is a valuable chemical intermediate. It can be alkylated to form materials which are useful as high energy fuels. See application Serial No. 540,143, filed October 12, 1955 in the names of Lawton, Weilmuenster and Levy.

Pentaborane(11) is a colorless, unstable liquid with a melting point of $-123°$ C. and a boiling point of 65° C. at atmospheric pressure. Its vapor pressure at 0° C. is 52.8 mm. The existence of pentaborane(11) was first discovered by Stock and Siecke in 1924 (Stock, A. and Siecke, W., Ber. 57B, 562, (1924)). From a considerable quantity of very carefully prepared diborane which had been allowed to stand at room temperature for about six months, Stock was able to isolate a mixture of tetraborane and pentaborane(11) by fractional distillation. Stock found it was a simple matter to separate the mixture of tetraborane and pentaborane(11) from the more volatile undissociated diborane and from the less volatile decaborane. The separation of pentaborane(11) from the tetraborane proved to be a somewhat more difficult problem. From 1400 cc. of diborane Stock isolated 0.08 cc. (liquid) of homogeneous pentaborane(11). On another occasion Stock obtained a few cubic centimeters of pentaborane (11) (normal gas) from 500 cc. of diborane that had previously been exposed to daylight for ten months. Stock noted that the instability of pentaborane(11) makes it very difficult to handle and to prepare in more than very small amounts. Burg and Schlesinger (Burg, A. B., and Schlesinger, H. I., J. A. C. S., 55, 4009 (1933)) prepared pentaborane(11) by repeated re-circulation of diborane through a tube heated to 115° C. These investigators reported a maximum conversion of only 3.5 percent; that is, 3.5 percent of the diborane which had been repeatedly recycled through the hot tube was converted to other higher boranes. Of the diborane converted, 94.7 percent was shown to be pentaborane(11) and tetraborane.

There is need, therefore, for a process which will avoid the long reaction period utilized by Stock in the preparation of only meager quantities of pentaborane(11) and to avoid the tedious recycling operations in the process of Burg and Schlesinger which result, at best, in only small conversions. This is accomplished in accordance with the present invention by passing diborane in gaseous form into contact with zirconium boride at a temperature of from 130° C. to 185° C.

The following examples illustrate various embodiments falling within the scope of our invention.

*Example I*

The catalyst used in this example was prepared from powdered commercial zirconium boride. By analysis this material was shown to contain 17.8 percent boron as compared to the calculated value of 19.17. To prepare the catalyst 0.7 g. of powdered zirconium boride, without any previous pre-treatment, was suspended on 1.0 g. of Pyrex glass wool. The zirconium boride which was about 300 mesh in size was thoroughly mixed with the glass wool by gentle grinding of the materials together in a mortar. In the next step the zirconium boride and glass wool were transferred to a glass reactor and placed on a coarse sintered glass disc which provided a support for the catalyst bed. Below the sintered disc and attached to the reactor there was a 12 inch glass preheater coil through which the gases passed prior to contacting the catalyst. The reactor with the catalyst in place was attached to a high vacuum line for the purpose of degassing the catalyst surface. To carry out this operation the reactor was enclosed in a "Hevi Duty" multiple unit electric furnace and the catalyst degassed at 400° C. for 14½ hours at a pressure of approximately 0.001 mm. of mercury.

After the catalyst bed still under vacuum had been allowed to cool to 175° C. a mixture of diborane, without any previous pretreatment, and high purity dry nitrogen was introduced into the reactor, first through the preheater and then up through the catalyst bed proper. The flow rates for both nitrogen and diborane, as measured by flowrators was 80 ml. per minute at 23.5° C. and atmospheric pressure. A total of 2.081 g. of diborane was passed over the catalyst over a period of 15 minutes (determined by the difference in weight of the 200 ml. stainless steel diborane cylinder before and after the experiment). During the course of the experiment the temperature of the reactor was maintained at 175±1° C.

Only a trace amount of decaborane was collected on the cold finger immediately above the catalyst bed which was maintained at a temperature of 0° C. while the other volatile boron hydrides, as well as unconverted diborane, were collected in two traps in series which were maintained at $-196°$ C. Material from the liquid nitrogen traps after being bulked was fractionated through a series of cold traps maintained at $-78°$ C., $-130°$ C. and $-196°$ C., respectively.

By means of infrared analyses of the individual products of the three traps it was determined that the conversion of diborane was 7.9 percent and that 92.1 percent of the diborane charged was recovered unchanged. Also, by means of the infrared analyses it was shown that the corrected yield of pentaborane(11) was 74.5 percent. The corrected yield of pentaborane(9) was 6.78 percent.

*Example II*

In this experiment the same reactor and preheater described in Example I were utilized. The catalyst was degassed by the same procedure as set forth in Example I. The quantity of zirconium boride catalyst, however, was 2.1 g. supported on 3.0 g. of glass wool. Immediately after the degassing process the catalyst was activated with dry hydrogen. Activation was accomplished by filling the hot evacuated reactor with dry hydrogen and allowing the hydrogen-filled reactor to cool to room temperature. In the next step the reactor and associated preheater were removed from the "degassing" vacuum line, capped and attached to a second vacuum line where the thermal treatment of diborane was carried out.

Diborane at the rate of 80 ml. per minute at 25° C. and at atmospheric pressure and nitrogen at the rate of 80 ml. per minute at 25° C. and at atmospheric pressure as measured with individual flowrators were passed through the catalyst bed for a period of 15 minutes. Before being introduced into the catalyst bed, the diborane and nitrogen were preheated to a temperature of about 175° C. in the preheater. During the 15 minutes reaction period a total of 2.128 g. of diborane was passed through the catalyst bed. Only a trace of decaborane was collected on the cold finger immediately above the catalyst bed which was maintained at 0° C. Volatile boron hydrides, as well as unconverted diborane, were collected in two traps, in series, which were maintained at −196° C.

Material collected in the liquid nitrogen-cooled traps, after being bulked, was fractionated through a series of cold traps maintained at −78° C., −130° C. and −196° C. respectively. By means of infrared analyses of the individual products from the three traps it was determined that the conversion of diborane was 7.05 percent and that the recovery of unreacted diborane was 92.95 percent. In a like manner, by infrared analyses, it was shown that the corrected yield of pentaborane(11) was 44 percent, the corrected yield of pentaborane(9) was 13.2 percent and the corrected yield of tetraborane was 2.3 percent.

Various modifications can be made in the procedures of the specific examples to provide other embodiments which fall within the scope of our invention. In general, the diborane conversion will be conducted at a temperature within the range from 130° C. to 180° C. and preferably from 160° C. to 180° C. As those skilled in the art will understand, the time factor employed when the diborane is contacted with the zirconium boride has an effect upon the amount of diborane converted to other products and also upon the yield of pentaborane(11) based upon the diborane converted. In general, the time factor utilized (grams of zirconium boride per gram mole of feed (diborane+inert gas) per minute) will be within the range from about $0.2 \times 10^2$ to about $2.8 \times 10^2$. In the specific examples, the diborane was admixed with nitrogen when the diborane was introduced into the catalyst bed. In place of nitrogen, other inert gases such as argon, helium or hydrogen can be utilized. If desired, no inert gas need be introduced into the catalyst bed together with the diborane, but where an inert gas is utilized it is preferably employed in the amount of from 0.25 to 4 volumes per volume of diborane.

We claim:

1. A method for the production of pentaborane(11) which comprises contacting diborane in gaseous form with solid zirconium boride at a temperature of from 130° C. to 185° C.

2. The method of claim 1 wherein the diborane is in admixture with from 0.25 to 4 volumes of nitrogen per volume of diborane.

No references cited.